J. T. HUME.
POWER TRANSMITTING MECHANISM.
APPLICATION FILED DEC. 27, 1904.
992,131.
Patented May 9, 1911.
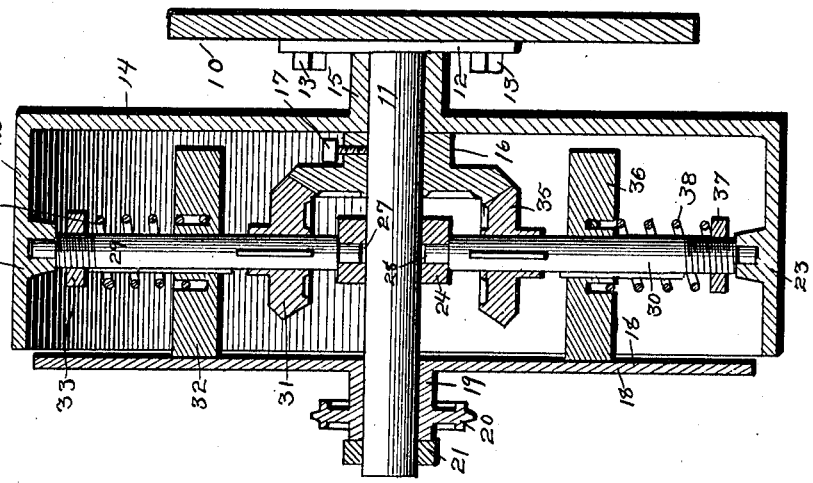
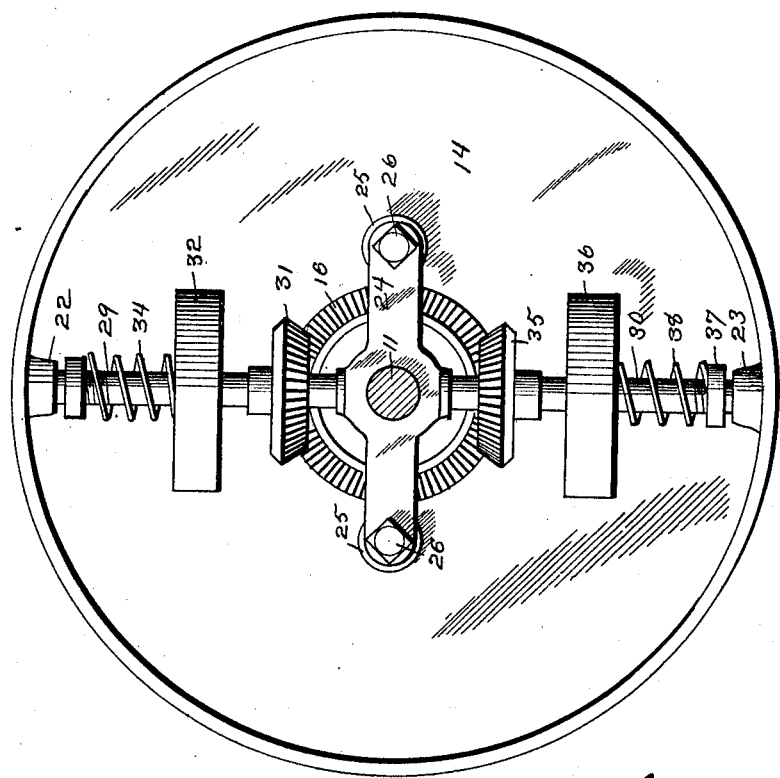
Witnesses
A. G. Hague
S. F. Christy.
Inventor, John T. Hume
By Orwig & Lane   Attys

UNITED STATES PATENT OFFICE.

JOHN T. HUME, OF NEWTON, IOWA.

POWER-TRANSMITTING MECHANISM.

992,131.  Specification of Letters Patent.  Patented May 9, 1911.

Application filed December 27, 1904. Serial No. 238,492.

*To all whom it may concern:*

Be it known that I, JOHN T. HUME, a citizen of the United States, residing at Newton, in the county of Jasper and State of Iowa, have invented a certain new and useful Power-Transmitting Mechanism, of which the following is a specification.

The objects of my invention are to provide a power transmitting mechanism in which the driving wheel will be operated at a variable speed and the driven mechanism operated from the driving wheel will be driven at a constant speed and in the opposite direction from the rotations of the driving wheel.

A further object is to provide a power transmitting mechanism which is simple in construction and in which there is a stationary shaft upon which all of the mechanism is mounted and around which the driving wheel and the driven mechanism rotates in operation.

My invention consists in certain details in the construction, arrangement and combination of the various parts of the device whereby the objects contemplated are attained, as hereinafter more fully set forth, pointed out in my claims and illustrated in the accompanying drawings, in which—

Figure 1 is a sectional view of the device, and Fig. 2 is a side view of the driving wheel, showing the mechanism on its interior. In this view the driven mechanism is removed.

Referring to the accompanying drawings, the reference numeral 10 indicates a portion of the frame of the machine to which my device is attached. I have provided a shaft 11 having a plate 12 at its inner end and formed integral with it which is secured to the frame by means of bolts 13 so that my mechanism can be easily attached to or detached from the frame 10 at the pleasure of the operator. Rotatably mounted on the shaft 11 is a driving wheel 14, which driving wheel has a hub 15, the inner end of which is in contact with the plate 12, and a flange 14ª extending outwardly from its outer periphery. Mounted on the shaft 11 and immediately outside of the hub 15 is a beveled gear 16 which is held in position relative to the shaft by means of the set screw 17. The inner portion of this beveled gear 16 and the outer portion of the plate 12 form limiting stops for the hub 15 and prevent the driving wheel from moving longitudinally of the shaft 11 as it is operated. Rotatably mounted on the shaft 11 and immediately outside of the flange 14ª of the driving wheel is a disk 18 which is driven in the manner hereinafter to be described. The hub 19 of this disk extends outwardly from its central portion and has upon it the sprocket wheel 20 over which a chain is passed and operatively connected with the rest of the driven mechanism. Outside of the hub 19 is a collar 21 secured to the shaft for maintaining the disk 19 in position as it is operated. Mounted in the flange of the wheel and at points diametrically opposite each other I have provided two bearings 22 and 23. Rotatably mounted on the shaft 11 and a slight distance outside of the beveled gear 16 is a bearing 24 which is secured by bosses 25 and bolts 26 to the driving wheel 14. This bearing 24 has two openings 27 and 28 on diametrically opposite sides of the shaft 11. Rotatably mounted in the bearing 23 and in the opening 28 of the bearing 24 is a shaft 30. Keyed to the shaft 29 and in mesh with the beveled gear 16 is a beveled gear 31. Feathered to the shaft 29 and outside of the beveled gear 31 is a friction wheel 32 which is constantly in engagement with the disk 18 and is designed to assist in driving said disk. Screwed to that portion of the shaft which is immediately inside of the bearing 22 is a nut 33. Mounted between the nut 33 and the friction wheel 32 is a spring 34 designed to rest against the nut 33 and normally hold the friction wheel 32 at its inner limit of movement. By screwing and unscrewing the nut 33 upon the shaft 29, the tension of the spring 34 can be increased or diminished readily so that the friction wheel 32 will move outwardly more or less readily as the mechanism is operated. Keyed to the shaft 30 and in mesh with the beveled gear 16 is a beveled gear 35. Feathered to the shaft 30 and outside the beveled gear 35 is a friction wheel 36 similar to the friction wheel 32 and constantly in engagement with the disk 18. Screwed to that portion of the shaft 30 which is immediately inside the bearing 23 is a nut 37. Mounted between the nut 37 and the friction wheel 36 is a spring 38 so arranged that it will normally hold the friction wheel 36 at its inner limit of movement. By screwing and unscrewing the nut 37, the tension of the spring 38 can be increased or diminished at the pleasure of the operator for the same purpose that the tension of the spring 34 may be increased or diminished. There may be several shafts similar to the shafts 29 and 30 and having the same mechanisms mounted upon them, provided, however, that all of these are inside of the flange 14ª of the driving wheel.

In practical operation, a belt is slipped onto the flange 14ª of the driving wheel 14 and a sprocket chain is passed around the sprocket wheel 20 and a sprocket wheel operatively connected with the mechanism which is to be driven from the disk 18, and assuming that the belt is being driven, the driving wheel will be rotated on the shaft 11 and this will cause the beveled gears 31 and 35 to be operated by and driven from the stationary beveled gear 16, for as the driving wheel is rotated, the shafts 29 and 30 will be driven around the shaft 11, and as they are thus driven, the beveled gears 31 and 35 which are keyed to these shafts will be driven around the shaft 11, and on account of these gear wheels being in mesh with the stationary gear 16, the shafts 29 and 30 will be rotated at the same time they are driven around the shaft 11. Thus the friction wheels 32 and 36 will be driven around the shaft 11 and also be rotated. On account of these friction wheels being in engagement with the disk 18, the disk will be rotated in the same direction as that in which the driving wheel 14 is rotated, thus causing the sprockets 20 and the mechanism which is operatively connected with it to be driven. As the shafts 29 and 30 are driven around the shaft 11, the friction wheels 32 and 36 will be forced outwardly against the resistance of the springs 34 and 38 respectively, and will drive the friction disk 18 at a constant speed, even though the speed of the driving wheel 14 is increased or diminished; that is the speed of the driven mechanism is constant to all practical purposes during the operation of the driving mechanism at a varied speed, thus producing a steady and constant operation of the driven mechanism at all times in its operation.

Having thus described my invention, what I claim and desire to secure by Letters Patent of the United States, therefor is—

1. A stationary shaft, a driving wheel rotatably mounted on the shaft, a disk rotatably mounted on the shaft, friction wheels operatively connected with the driving wheel and in engagement with the disk, means for driving the friction wheels around the shaft, and means for rotating said wheels as the driving wheel is rotated.

2. A stationary shaft, a flanged wheel rotatably mounted on the shaft, a disk mounted on the shaft and adjacent to the wheel, a beveled gear wheel fixed to the shaft, auxiliary shafts rotatably mounted inside of the flange of the wheel, beveled gears on each of the auxiliary shafts in mesh with the beveled gear fixed to the shaft, friction wheels on each of the shafts in engagement with the disk, so arranged that as the driving wheel is rotated, the friction wheels will be rotated and they will cause the friction disk to be rotated in the same direction as the driving wheel is rotated.

3. A stationary shaft, a flanged wheel rotatably mounted on the shaft, a disk mounted on the shaft and adjacent to the wheel, a beveled gear wheel fixed to the shaft, auxiliary shafts rotatably mounted inside of the flange of the wheel, beveled gears on each of the auxiliary shafts in mesh with the beveled gear fixed to the shaft, friction wheels feathered to the shaft and in engagement with the disk.

4. A stationary shaft, a flanged wheel rotatably mounted on the shaft, a disk mounted on the shaft and adjacent to the wheel, a beveled gear wheel fixed to the shaft, auxiliary shafts rotatably mounted inside of the flange of the wheel, beveled gears on each of the auxiliary shafts in mesh with the beveled gear fixed to the shaft, friction wheels feathered to the shaft and in engagement with the disk, and springs mounted on each of the shafts for normally maintaining the friction wheels away from their outer limit of movement as they are driven around the stationary shaft.

5. A stationary shaft, a flanged wheel rotatably mounted on the shaft, a disk mounted on the shaft and adjacent to the wheel, a beveled gear wheel fixed to the shaft, auxiliary shafts rotatably mounted inside of the flange of the wheel, beveled gears on each of the auxiliary shafts in mesh with the beveled gear fixed to the shaft, friction wheels feathered to the shaft and in engagement with the disk, springs mounted on each of the shafts for normally maintaining the friction wheels away from their outer limit of movement as they are driven around the stationary shaft, and means for adjusting the tension of the springs.

6. A stationary shaft, a flanged wheel rotatably mounted on the shaft, a disk mounted on the shaft and adjacent to the wheel, a beveled gear wheel fixed to the shaft, auxiliary shafts rotatably mounted inside of the flange of the wheel, beveled gears on each of the auxiliary shafts in mesh with the beveled gear fixed to the shaft, friction wheels feathered to the shaft and in engagement with the disk, and a sprocket wheel attached to the disk which is designed to be operatively connected with the mechanism to be driven.

7. The combination of a stationary shaft, a driving member fixed upon said shaft, a drive wheel rotatably mounted on said shaft, a rotatable disk on said shaft, friction wheels operatively connected with said drive wheel and said driving member, said friction wheels being in engagement with said disk and capable of movement toward and away from said shaft as the drive wheel is rotated, whereby said friction wheels will cause the disk to be driven at a constant speed irrespective of variations in the speed of the drive wheel, and yielding means for resisting the outward thrust of said friction wheels due to centrifugal action.

JOHN T. HUME.

Witnesses:
T. G. BRYANT,
W. THOMAS.

Copies of this patent may be obtained for five cents each, by addressing the "Commissioner of Patents, Washington, D. C."